May 28, 1957 T. H. WAY ET AL 2,793,571
SUCTION PRESS ROLL
Filed Nov. 15, 1949
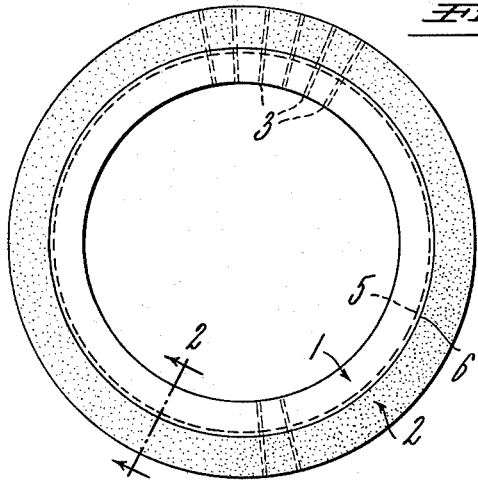
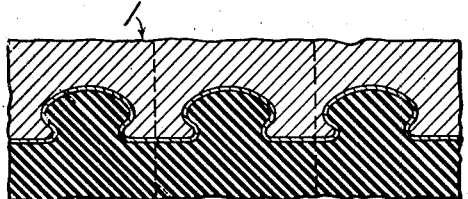
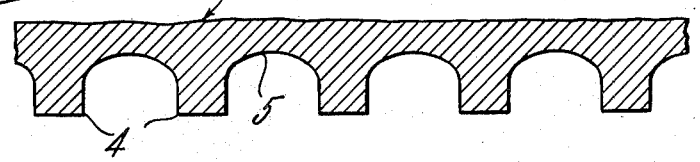
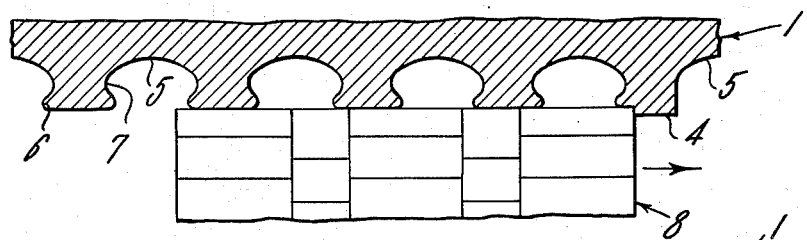
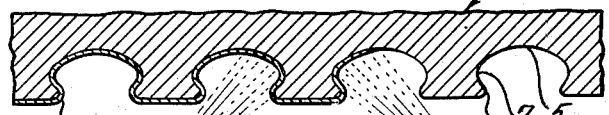
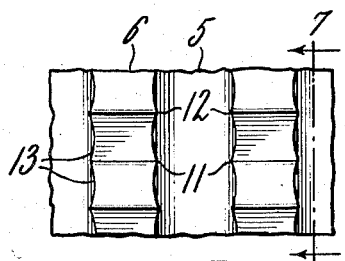
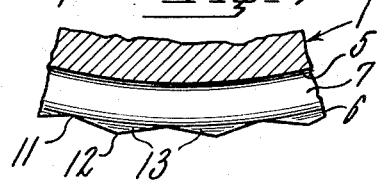
INVENTOR.
THOMAS H. WAY
BY
Robert J. Patterson
ATTORNEY United States Patent Office 2,793,571
Patented May 28, 1957

2,793,571

SUCTION PRESS ROLL

Thomas H. Way, Toronto, Ontario, and Donald G. McLeod, Westmount, Quebec, Canada, assignors to United States Rubber Company, New York, N. Y., a corporation of New Jersey Application November 15, 1949, Serial No. 127,355

13 Claims. (Cl. 92—53)

This invention relates to an improved suction press roll and process of making same. More particularly it relates to an improvement in the manufacture of suction press rolls whereby far better bonding between the rubber cover and the cylindrical bronze shell is obtained than has been possible heretofore.

Suction press rolls are important pieces of equipment in paper machines. The function of the suction press roll is as follows: The wet sheet of paper pulp traveling upon a felt sheet or belt runs between a top press roll and a lower suction press roll which is perforated and applies vacuum to the sheet to remove water therefrom. Thus the water is expressed from the sheet of pulp by squeezing between the rolls and is withdrawn under vacuum through the perforations in the suction roll which are in contact with the felt. Thence the paper sheet and felt pass into the drying machine.

Originally, suction press rolls consisted of cast, perforated bronze shells. Later it was found that greater felt life and other economies were obtained by applying a rubber covering to the bronze shell. Commonly the shell has a thickness of about 1½" and the rubber cover is of a thickness of about 1". However, a serious problem was encountered in the attempt to apply the rubber cover to the suction press roll. This problem was that rubber will not adhere to bronze. As a result, it was found necessary to use a mechanical locking device to mechanically tie or lock the rubber cover to the shell. This mechanical locking was accomplished by grooving the shell with longitudinal and circumferential dovetail grooves over its entire surface, filling these grooves with hard base rubber stock, i. e., a rubber compound which upon vulcanization yields hard rubber, and applying the unvulcanized soft base rubber cover stock around the hard base stock. In this way upon vulcanization a mechanical anchorage for the soft rubber cover was provided. Additional means for holding the soft rubber cover in place were provided by the use of the differential pressure cure method shown in Canadian Patent No. 368,247 (corresponding to U. S. 2,115,543) to C. C. Thackray.

Numerous difficulties were encountered in the manufacture of rubber covered suction press rolls in the manner just outlined. The machining operation to provide the dovetail grooving was extremely expensive. Another difficulty was that frequently the rubber cover became loose due to separation from the bronze shell. In some cases this looseness was apparent at the time of vulcanization and in other cases it appeared a short time after the suction press roll was placed in service. When this looseness developed, the successful operation of the roll was interfered with since even a slight loosening of the rubber cover resulted in a marking of the sheet of paper. As a result, the rubber cover had to be stripped and a new cover applied. This was extremely expensive. Another objection to the prior art construction was that the effective wearing thickness of the soft rubber cover was greatly reduced because of the thickness of the hard rubber base required to provide the means of bonding the outer cushion stock to the roll. Thus, when the soft rubber cover had been ground down close to the hard rubber base, the roll could no longer be used.

Still another objection to the prior art method of covering bronze rolls with soft rubber was that in many cases it could not be utilized to apply a soft rubber cover to an existing bronze shell because of the fact that the shell thickness was insufficient to permit the longitudinal and circumferential dovetail groving without seriously weakening the bronze shell to the point where collapse might occur. It has been customarily thought necessary to provide dovetail grooving 5/16" in depth longitudinally and 5/32" in depth circumferentially. It will be obvious that grooving of such depths greatly weakens a thin roll.

The principal object of the present invention is to provide a process of attaching a soft rubber cover to a bronze shell which completely eliminates the above mentioned disadvantages and objections to prior art practice. Another object is to provide such a process which is simple and economical. Another object is to provide a bond which is much stronger and which stands up much longer under the conditions encountered in serivec. Numerous other advantages will more fully hereinafter appear.

In the accompanying drawings, which are diagrammatic merely and are greatly exaggerated to portray the invention:

Fig. 1 is an end view of a suction press roll made in accordance with the present invention.

Fig. 2 is a fragmental radial section taken on the line 2—2 of Fig. 1.

Fig. 3 is a fragmental longitudinal section of the surface of the bronze shell after the threading operation described below.

Fig. 4 illustrates the knurling operation.

Fig. 5 illustrates the step of spraying the knurled threaded surface of the bronze shell with stainless steel.

Fig. 6 is a fragmental view showing the knurled threaded surface in elevation. This is an exaggerated view of an idealized knurled threaded surface; and Fig. 7 is a section on the line 7—7 of Fig. 6.

The present invention is based upon the discovery that a remarkable bond between the soft rubber cover and the cylindrical bronze shell of a suction press roll can be obtained in a simple and economical manner by forming on the outer surface of the bronze shell integral upstanding projections, widening the outer ends of these projections so that the end portions thereof are wider than the shank portions, spraying stainless steel upon the thus-prepared outer surface of the bronze shell and thereby building up a thin coating of stainless steel over the outer surface of the shell, applying the rubber cover over the stainless steel-coated surface and vulcanizing the rubber cover. In practice, the invention is preferably carried out by threading the surface of the shell to form integral upstanding screw threads having straight side walls on their outer portions and straight tops, knurling the outer surface of the shell and thereby widening or mushrooming the outer ends of the threads so that the end portions are wider than the shank portions and simultaneously transversely knurling the end portions, after which the sprayed stainless steel coating is applied followed by the rubber cover.

In the drawings, the finished suction press roll of our invention is portrayed in Fig. 1 wherein reference numeral 1 designates the cylindrical bronze shell and 2 designates the surrounding soft rubber cover. The roll is provided with conventional perforations 3 which extend entirely through the shell 1 and rubber 2 and serve to apply the suction to the paper stock. The manner of achieving the bond between the shell 1 and the soft rubber cover 2 will now be described by reference to the other figures.

The cylindrical shell 1 is first screw-threaded as shown in Fig. 3. This threading operation results in the formation of upstanding screw threads 4 between which are depressions 5. It is preferred that threads 4 have substantially straight side walls throughout the major portion of their depth and that they have straight tops which originally were the periphery of shell 1. It is also preferred that the number of threads per inch be at least 15 and not over 20. Threading with 16 threads to the inch has been found to be very satisfactory. After threading, the surface is then subjected to the knurling operation portrayed in Fig. 4. This serves to mushroom the outer ends of the threads 4 so as to form widened portions 6 which have a width considerably greater than the shank portions 7. As will presently appear, the knurling step also serves to substantially increase the surface area of the widened portions 6 by reason of the shaping transverse cutting action of the teeth of the knurling tool. The knurling conveniently done with a freely rotatable knurling wheel 8 composed of five individual knurling discs. As shown, three of these knurling discs may conveniently be relatively thick while the other two are thin. For example, the three wider discs may be 1/16" in thickness and the other two may be 1/32" in thickness. The knurling discs are made of hardened steel and are provided on their periphery with pointed teeth, as is conventional in knurling operations. The knurling is preferably carried out on the same lathe as that on which the threading was done, the knurling tool 8 being mounted in the tool post of the lathe and moved in the direction of the arrow on Fig. 4 while the shell 1 is rotated. It is preferred that the discs in the knurling tool 8 be so arranged that the knurling is staggered, this staggering of the knurling discs being shown in Fig. 4.

The thus-prepared shell 1 is then sprayed with stainless steel as portrayed in Fig. 5. It has been discovered that by spraying the knurled threaded surface of the shell with stainless steel to build up thereon a thin coating 9 of stainless steel, a remarkably good bond is obtained between the applied rubber cover and the bronze shell. This is in contrast to the prior method described above wherein the bonding of the rubber to the bronze was mechanical only, the hard rubber base being mechanically interlocked with the dovetail-grooved surface of the bronze shell. In the present invention, on the other hand, the sprayed stainless steel coating 9 is tightly bonded to the bronze shell 1 and the rubber cover 2 is in turn tightly bonded to the sprayed stainless steel coating 9. It is preferred to employ two oppositely directed stainless steel spraying guns 10 mounted upon a twin bracket (not shown) attached to the tool post of the lathe and to move the guns 10 in the direction of the arrows on Fig. 5 while the bronze shell 1 is rotated in the same manner as it was rotated during the preceding operations of threading and knurling. Preferably the spray guns are so mounted that between them the entire surface of the widened portions 6, shanks 7 and depressions 5 are entirely coated with a thin layer 9 of stainless steel. The optimum thickness of layer 9 is between 0.005" and 0.008". Layer 9 should be of substantial thickness, say at least 0.001" thick, in order to provide the desired bond between the rubber cover 3 and the bronze shell 1, but should not be so thick that the cost of building it up is excessive or that the recesses between the projections are filled up to an excessive extent. Generally, the thickness should not exceed 0.010". Workers in the art will be able to determine a suitable thickness for the sprayed deposit 9 in the light of this specification.

Figs. 6 and 7 portray diagrammatically the appearance of the knurling resulting from the operation of Fig. 4. Because of the transverse motion of the knurling tool 8 (which rotates about its own axis at the same peripheral speed as shell 1), the teeth of the individual knurling wheels deform the metal in the outer portion of the mushroomed portions 6 in addition to causing the flattening or mushrooming of the ends of threads 4. This deformation is transverse because of the transverse movement of the knurling tool and results in the formation of transverse grooves or low portions 11 and elevations 12 respectively corresponding to high and low portions of the periphery of the discs of knurling tool 8. The knurling also results in the formation of irregular sides as shown, in the mushroomed outer portions 6, the irregularities in the sides of widened portions 6 consisting of arcuate portions 13 extending between low spots 11 and high spots 12. As previously indicated, Figs. 6 and 7 portray an idealized or theoretical form of knurling which may not be exactly obtained in practice but which will generally be fairly closely approximated.

After the spraying step shown in Fig. 5, the soft rubber cover 2 is applied in any manner. The method of applying the soft rubber cover 2 to the thus-prepared shell 1 does not per se constitute any part of the present invention since any of the conventional methods of applying rubber to metal may be used. Regardless of the method of applying the rubber cover 2 the sprayed shell 1 should be allowed to cool down sufficiently, before the first portion of rubber or cyclized rubber is applied thereto, to prevent injury or decomposition of the rubber at the point of bonding.

In a preferred method of applying the soft rubber cover 3, a cyclized rubber cement is first applied to the stainless steel sprayed surface. This cement consists of cyclized rubber (a well-known material, also often known as rubber isomer, commonly used for bonding rubber to metal, e. g., as shown in Geer, U. S. Patent 1,617,588) dissolved in any suitable volatile organic solvent. Preferably a plurality of coatings of cyclized rubber cement are applied with intermediate drying of each. This results in building up a film of cyclized rubber not more than a few thousandths of an inch thick, typically not over 0.005" in thickness. After drying the final coating of cyclized rubber cement, the soft rubber cover is then applied in such manner as to completely fill the recesses in the surface of the shell 1 and completely surround the projections 7 and flattened portions 6. The assembly is then vulcanized.

In an alternative method of procedure, a cement consisting of unvulcanized hard rubber stock in a suitable volatile organic solvent is applied directly to the stainless steel coating 9. Again a plurality of separate coatings of the cement may be applied with intermediate drying of each. There is then applied a solid layer of unvulcanized hard rubber base stock of substantial thickness. Again this stock is worked into the surface of the shell 1 to fill up the cavities completely. Usually this base stock extends substantially outwardly of the ends of the flattened projections. There is then applied around the hard rubber stock the unvulcanized soft rubber cover stock. The assembly is then vulcanized in the usual manner.

A marked advantage of the present invention in the embodiment wherein hard rubber base stock is used next to the stainless steel coating 9 is that this layer of hard rubber stock can be considerably thinner than that necessary in the mechanical bond process formerly used as described above. Thus with the present invention the hard rubber base stock need only be 1/8" in thickness whereas in previous practice with mechanical bonding, the depth of the hard rubber bonding stock was considerably greater than this, often being as thick as 3/8".

It will be obvious that the threads formed initially in the surface of shell 1 are quite shallow, usually not exceeding 0.05" in depth and commonly being of the order of 0.025" in depth. It was unexpected to find that such a remarkable degree of bonding of the rubber cover 2 to the shell 1 could be secured with such shallow threading or grooving of the shell 1.

It will be understood by those skilled in the art that it is necessary at some point in the operation to perforate the roll over substantially its entire area. This may be done in any way known to the art. It is often preferred to use a solid unperforated shell 1, to cover it as described above, to then drill from the inside outwardly through the shell and then by indexing the drills to the holes thus formed in the shell to drill through the cover from the outside inwardly, thereby providing the perforations 3 extending through both the shell 1 and the cover 2. In some cases, however, a perforated shell 1 may be used and perforations 3 may be completed by driving pins outwardly through the unvulcanized cover 2 as shown in the Thackray patent mentioned above. Pins driven from the inside outwardly easily pass through the stainless steel coating 9 and thence through the unvulcanized cover stock. After vulcanization, these pins may be withdrawn to form the perforations 3.

The following example illustrates the present invention in more detail.

Example

A cylindrical bronze shell approximately 1½" thick and having an outside diameter of 26¼" and a face 174" in length was placed in a lathe and rotated about its longitudinal axis. The exterior was first cleaned by taking a very light cut across the face of the roll. The surface of the roll was then lightly threaded in accordance with the following specifications:

16 threads per inch.
Depth of thread—0.025".
Width of thread—0.042"–0.045".

The thread obtained was like that shown in Fig. 3.

In the case of rolls which are partly perforated and partly unperforated, it was found preferable to first cut leader threads not deeper than 0.005" on the unperforated sections of the shell, adjusting the depth of the cut to the full 0.025" while traversing the perforated part of the shell. It is of course necessary to recut the leader threads to the full depth of 0.025" as a secondary operation on the unperforated sections of the roll. In the case of rolls which are entirely unperforated, the aforementioned leader threads should be cut over the entire surface of the roll.

The tops of the thread were then crimped, i. e., mushroomed or flattened, by means of a rotary knurling tool consisting of five knurling discs locked together, three of these discs being ¹⁄₁₆" thick and the other two being ¹⁄₃₂" thick, these discs being so arranged that the knurling was staggered. The knurling tool was mounted opposite to the centre line of the rotating roll 1, first brought forward to brush contact with the roll, and then forced in an additional 0.007" whereupon knurling began. It is preferred to carry out the knurling at an odd travel since it has been found that this helps to flatten out the tops of the threads. Movement of the knurling tool at a ratio of seven threads per inch is convenient. By moving the knurling tool transversely at a rate greater than that corresponding to the pitch of the thread, the teeth of the knurling tool are caused to move transversely across the tops of the threads resulting in the structure portrayed in Figs. 6 and 7 and giving a substantially greater surface area than would otherwise be obtained. The roll may be rotated at any suitable speed during the knurling operation. Speeds ranging from 20 R. P. M. up to full lathe speed may be used. In order to establish the most satisfactory knurl and to insure total coverage of the roll with the knurling tool, the knurling operation was performed three times.

The preliminary machining, threading and knurling of the roll should be performed successively without delay so that the bronze shell 1 will not be given time to sag out of true.

After knurling the stainless steel coating was applied to the bronze shell. Austenitic stainless steel of the type known as 18/8 was used. As is well known, 18/8 stainless steel contains 18 percent chromium and 8 percent nickel, and has a low carbon content. The term "austenitic" denotes that it is a solid solution. Two spray guns mounted angularly at a distance of 7" from the work were used. The spray was regulated to produce a total metal thickness of from 0.005" to 0.008". The sprayed coating was allowed to cool down nearly to room temperature whereupon the soft rubber cover 2 was applied in either of the two ways described above, i. e., either with cyclized rubber cement followed by soft rubber stock or by preliminarily coating with hard rubber stock cement followed by solid hard rubber stock ⅛" in thickness followed by soft rubber stock. In either event, the thickness of the soft rubber cover was such that the resulting roll had an outside diameter of 29¼". The roll was then drilled to provide the perforations 3.

From the foregoing description many advantages of the present invention will be apparent to those skilled in the art. The principal advantage is that an unusually effective bonding of the soft rubber cover 2 to the bronze shell 1 is obtained. It is believed that a chemical or quasi-chemical bond, based upon mutual inter-molecular attraction, is obtained between the stainless steel and the bronze on the one hand and between the stainless steel and the rubber on the other hand. Regardless of theory or mechanism, the degree of bonding obtained is exceedingly high. The high degree of bonding cannot be attributed to the slight mechanical interlocking obtained between the knurled threaded shell 1 and the rubber cover 2 because without the intermediate stainless steel coating 9, the cover 2 would not adhere at all satisfactorily. Another advantage of the present invention is that where a hard rubber base stock is used next to the stainless steel layer 9, this hard rubber base stock layer can be considerably thinner than that heretofore used on the mechanically grooved type of shell; hence a correspondingly greater effective thickness of soft rubber cover is available resulting in greater resilience and longer service life. Another advantage of the present invention in the embodiment where the soft rubber cover stock is used next to the sprayed metal layer 9, nearly the entire cover thickness is available for service and for regrinding. Another advantage of the present invention is that it makes it possible to apply a rubber cover to existing rolls the shells of which are not thick enough to allow the heavy dovetail grooving required in the mechanical bonding method described above. Another advantage of the present invention is that when it is desired to re-cover the roll a minimum amount, usually only approximately 0.025" of thickness has to be shaved off the roll to prepare it for the next threading, knurling, spraying of stainless steel and application of rubber cover. Another advantage is that the roll can be readily drilled to perforate it, since the stainless steel layer 9 does not interfere with easy drilling. Numerous other advantages will be obvious to those skilled in the art.

This application is a continuation-in-part of application Serial No. 32,448, filed June 11, 1948, which has become abandoned.

Having thus described our invention what we claim and desire to protect by Letters Patent is:

1. A perforated suction press roll comprising a cylindrical bronze shell, substantially the entire outer surface of said shell being provided with integral upstanding screw threads, the outer ends of said screw threads being flattened by inward deformation so that the end portions are wider than the shank portions, a thin sprayed stainless steel coating upon the resulting outer surface, said coating extending into the spaces between said screw threads to bond intimately the coating to the roll surface, said coating extending over substantially the entire outer surface of said shell, and a rubber cover surrounding and intimately bonded to said coating over substantially the entire area thereof.

2. A perforated suction press roll comprising a cylindrical bronze shell, the outer surface of said shell being provided with integral upstanding screw threads the outer ends of which have been flattened by inward deformation so that the end portions are wider than the shank portions, a sprayed stainless steel coating upon and intimately bonded to the resulting outer surface, said coating being of thickness so limited that its outer configuration corresponds to the configuration of said outer surface, and a rubber cover surrounding and intimately bonded to said coating over substantially the entire area thereof.

3. A roll as recited in claim 2 wherein said sprayed stainless steel coating has a thickness of at least 0.001" and not over 0.010".

4. A roll as recited in claim 2 wherein said sprayed stainless steel coating has a thickness of from 0.005" to 0.008".

5. A roll as recited in claim 2 wherein the number of said threads per inch is at least 15 and not over 20 and wherein said sprayed stainless steel coating has a thickness of at least 0.001" and not over 0.010".

6. A perforated suction press roll comprising a cylindrical bronze shell, the outer surface of said shell being provided with integral upstanding circumferentially extending screw threads the outer ends of which have been flattened by inward deformation so that the end portions are wider than the shank portions and transversely knurled, a thin sprayed stainless steel coating upon and intimately bonded to the resulting outer surface, said coating extending into the spaces between said projections to bond intimately the coating to the roll surface, and a rubber cover surrounding and intimately bonded to said coating over substantially the entire area thereof.

7. A perforated suction press roll comprising a cylindrical bronze shell, the outer surface of said shell being provided with integral upstanding screw threads which originally had straight side walls and straight top portions which have been flattened by inward deformation so that the end portions are wider than the shank portions and transversely knurled, a sprayed stainless steel coating upon and intimately bonded to the resulting outer surface, said coating being of thickness so limited that its outer configuration corresponds to the configuration of said outer surface, and a rubber cover surrounding and intimately bonded to said coating over substantially the entire area thereof.

8. The process of making a suction press roll which comprises forming integral upstanding screw threads over the outer surface of a cylindrical bronze shell, flattening the outer ends of said screw threads by inwardly deforming them so that the end portions are wider than the shank portions, spraying a thin stainless steel coating over the resulting surface so the stainless steel extends into the spaces between the projections to bond the coating intimately to the shell, applying a rubber cover over substantially the entire stainless steel coated surface of said shell, vulcanizing said cover, and at some point in the process perforating the roll.

9. The process of making a suction press roll which comprises forming integral upstanding screw threads having straight sides and tops over the outer surface of a cylindrical bronze shell, transversely knurling the outer surface of said shell and thereby flattening the outer ends of said threads by inwardly deforming them so that the end portions are wider than the shank portions and simultaneously substantially increasing the surface area of the flattened end portions by the shaping and transverse cutting action of the knurling tool, spraying stainless steel over substantially the entire outer surface of said shell as thus prepared and thereby building up a coating of stainless steel of thickness so limited that its outer configuration corresponds to the configuration of said outer surface, applying a rubber cover over substantially the entire stainless steel-coated surface of said shell, vulcanizing said cover, and at some point in the process perforating the roll.

10. The method of making a suction press roll which comprises screw-threading the outer surface of a cylindrical bronze shell in such a way as to form thereon integral upstanding screw threads having straight side walls on their outer portions throughout the major portion of their depth, said threads having straight tops and having rounded bottom portions between adjacent threads, the number of said threads ranging from 15 to 20 per inch, knurling the outer surface of the exteriorly threaded shell and thereby mushrooming the outer ends of said threads inwardly so as to form widened portions of a width considerably greater than the shank portions thereof, moving the knurling tool transversely with respect to said threads at a rate greater than that corresponding to the pitch of the threads while rotating said shell on its longitudinal axis and thereby substantially increasing the surface area of the widened portion of the threads by reason of the shaping and transverse cutting action of the teeth of the knurling tool, spraying the outer surface of the thus-prepared shell with stainless steel and thereby building up thereon a uniform coating of stainless steel having a thickness of from 0.001 to 0.010", the outer configuration of said coating corresponding to the configuration of the threaded and knurled surface, applying over the resulting stainless steel coating a coating of cement composed of cyclized rubber dissolved in a volatile organic solvent, evaporating the solvent and thereby forming a thin film of cyclized rubber over said stainless steel coating, applying unvulcanized soft rubber cover stock over said film in such a way as to completely fill the recesses in the surface of the resulting shell and extend outwardly of the shell to the extent desired in the final cover, vulcanizing the assembly, and at some point in the process perforating the roll.

11. The method of making a suction press roll which comprises screw-threading the outer surface of a cylindrical bronze shell in such a way as to form thereon integral upstanding screw threads having straight side walls on their outer portions throughout the major portion of their depth, said threads having straight tops and having rounded bottom portions between adjacent threads, the number of said threads ranging from 15 to 20 per inch, knurling the outer surface of the exteriorly threaded shell and thereby mushrooming the outer ends of said threads inwardly so as to form widened portions of a width considerably greater than the shank portions thereof, moving the knurling tool transversely with respect to said threads at a rate greater than that corresponding to the pitch of the threads while rotating said shell on its longitudinal axis and thereby substantially increasing the surface area of the widened portion of the threads by reason of the shaping and transverse cutting action of the teeth of the knurling tool, spraying the outer surface of the thus-prepared shell with stainless steel and thereby building up thereon a uniform coating of stainless steel having a thickness of from 0.001 to 0.010", the outer configuration of said coating corresponding to the configuration of the threaded and knurled surface, applying over the resulting stainless steel coating a coating of cement composed of unvulcanized hard rubber stock dissolved in a volatile organic solvent, evaporating the solvent and thereby forming a thin film of unvulcanized hard rubber stock over said stainless steel coating, applying a layer of unvulcanized hard rubber stock over said film in such a way as to completely fill the recesses in the surface of the resulting shell and extend outwardly of the flattened ends of said threads, applying around said layer of unvulcanized hard rubber stock an unvulcanized soft rubber cover stock, vulcanizing the assembly, and at some point in the process perforating the roll.

12. The process of preparing a metal roll shell, corrosive to rubber, for bonding thereto of a rubber covering which comprises the steps of spirally grooving the outer surface of the shell leaving a ridge between the groove; knurling the ridge to roughen the surface on the top of the ridge and to spread the ridge to give the groove a dove tail configuration in cross section; directing a spray of a non-corrodible porous metal on the surface of the groove and ridge at an angle of approximately 45° to the longitudinal axis of the shell to form a continuous layer of porous metal which follows the contour of the groove defining walls of the shell, thus retaining the dove tail configuration of the groove cross section; and vulcanizing a rubber covering to said metallic layer so that the rubber interlocks with said dove tail grooves.

13. The process according to claim 12 wherein the non-corrodible metal is stainless steel.

References Cited in the file of this patent

UNITED STATES PATENTS

| Number | Name | Date |
|---|---|---|
| Re.19,155 | Dales | May 8, 1934 |
| 1,412,326 | Williams | Apr. 11, 1922 |
| 1,657,014 | Klaus | Jan. 24, 1928 |
| 1,819,147 | Bronson | Aug. 18, 1931 |
| 1,895,039 | Joseph | Jan. 24, 1933 |
| 1,947,636 | Berry | Feb. 20, 1934 |
| 1,950,894 | Koch | Mar. 13, 1934 |
| 2,069,119 | Standley et al. | Jan. 26, 1937 |
| 2,157,456 | Koyemann | May 9, 1939 |
| 2,289,620 | Bernstein | July 14, 1942 |
| 2,314,902 | Shepard | Mar. 30, 1943 |
| 2,337,555 | Hosking | Dec. 28, 1943 |
| 2,367,796 | Peterson et al. | Jan. 23, 1945 |
| 2,422,903 | Huston | June 24, 1947 |

FOREIGN PATENTS

| Number | Country | Date |
|---|---|---|
| 365,755 | Great Britain | Jan. 28, 1932 |